United States Patent [19]

Criscimagna et al.

[11] 3,962,700

[45] June 8, 1976

[54] ALPHANUMERIC GAS DISPLAY PANEL WITH MODULAR CONTROL

[75] Inventors: Tony N. Criscimagna, Woodstock; Albert O. Piston, Catskill, both of N.Y.

[73] Assignee: IBM Corporation, Armonk, N.Y.

[22] Filed: Dec. 30, 1974

[21] Appl. No.: 537,238

[52] U.S. Cl. .................... 340/324 M; 315/169 TV; 340/166 EL; 340/337

[51] Int. Cl.[2] .................................... G06F 3/14

[58] Field of Search ............ 340/324 M; 315/169 R, 315/169 TV; 178/7.3 D; 358/56

[56] References Cited

UNITED STATES PATENTS

| | | | |
|---|---|---|---|
| 3,173,745 | 3/1965 | Stone et al. | 315/169 TV |
| 3,263,028 | 7/1966 | Shanafelt et al. | 178/7.3 D |
| 3,747,073 | 7/1973 | Sharpless | 340/324 M |
| 3,793,629 | 2/1974 | Sharpless | 340/324 M |
| 3,839,713 | 10/1974 | Urade et al. | 340/324 M |
| 3,877,006 | 4/1975 | Reboul et al. | 340/324 M |

*Primary Examiner*—David L. Trafton
*Attorney, Agent, or Firm*—William S. Robertson

[57] ABSTRACT

A modular control system is provided for a gas panel of the type having an array of row wires and column wires that form light emitting cells at their crossover points. A row counter and a column counter provide selection signals for entering characters sequentially on the panel. The counters provide borrow and carry signals to components that control the display. Thus, the control operates without regard to the actual size of the display and provides a modular construction for displays of various sizes.

6 Claims, 1 Drawing Figure

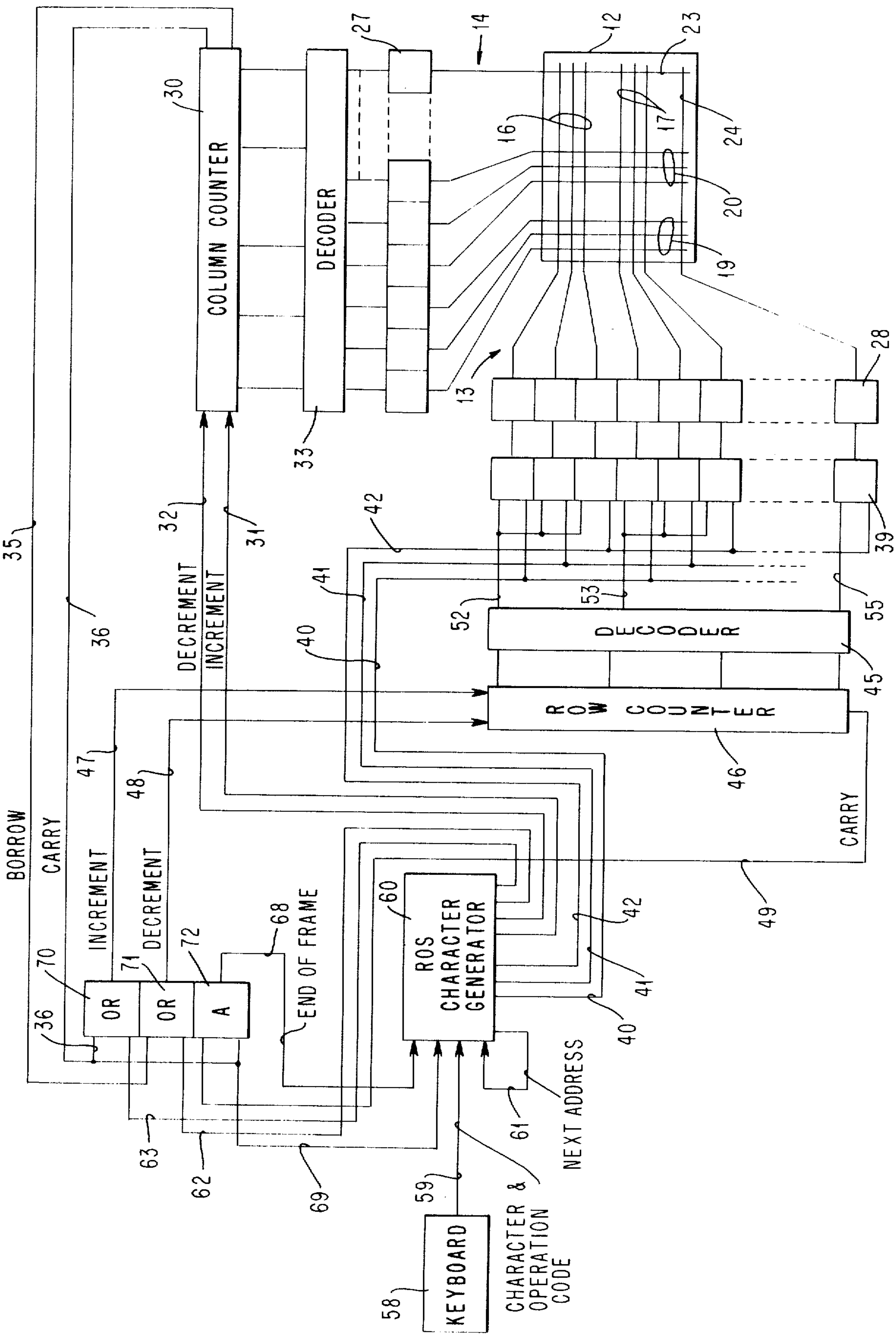
COLUMN COUNTER
DECODER
ROW COUNTER
DECODER
ROS CHARACTER GENERATOR
KEYBOARD
OR
OR
A
BORROW
CARRY
INCREMENT
DECREMENT
DECREMENT
INCREMENT
END OF FRAME
NEXT ADDRESS
CHARACTER & OPERATION CODE
CARRY
12
13
14
16
17
19
20
23
24
27
28
30
31
32
33
35
36
39
40
41
42
45
46
47
48
49
52
53
55
58
59
60
61
62
63
68
69
70
71
72

ALPHANUMERIC GAS DISPLAY PANEL WITH MODULAR CONTROL

INTRODUCTION

Gas display panels are well known, but it will be helpful to review the features and terminology that particularly apply to this invention. A gas panel has a set of row wires and a set of column wires that are spaced apart from each other and form light emitting cells at their crossover points. In a write operation, a row wire and a column wire are energized to produce ionization at the cell at their crossover point, and the insulating walls of the cell store the charge that results from this ionization. In a sustain operation, all of the cells are given an alternating polarity voltage that is of sufficient amplitude in combination with the wall charge of a previously written cell to produce ionization. The sustain operation produces a rapid series of light pulses at a written cell that appears as a continuous point of light. A cell that has been previously written can be erased by an operation that removes the wall charge.

A gas panel is readily adaptable to display characters that can be formed from a matrix of dots. A group of row wires form a character row and a group of column wires form the width of the character. The pattern of the cells that are to be turned on is held in a data store. When a user keys a character from a keyboard, a code is generated by the keyboard and is used as an address for selecting a word from the store. One field in this word has the data pattern for one column or "slice" of the character. Another field has timing and control signals, and another field has the address of a next word that is to be read from the store for a next slice of the character. Conventionally, a counter provides signals for advancing the character position from one position to the next and from row to row. An object of this invention is to provide a gas panel with a new and improved selection and control circuit that permits these components to be constructed as modular units for use with various display sizes.

SUMMARY OF THE INVENTION

This invention provides separate row and column counters for a gas display panel. A logic circuit is provided for incrementing or decrementing these counters as the operation proceeds. The counters supply signals to the logic circuit and to conventional components of the gas panel to produce a sequential display operation on the display panel. Thus, a modular control circuit can operate with displays and counters of various selected sizes. Alternatively, row and column counters of adjustable lengths can be included as part of the modular control unit to operate with gas panels of various sizes.

The detailed description of a preferred embodiment of the invention will set out additional objects, advantages, and features of this invention.

THE DRAWING

The drawing is a schematic representation of the preferred embodiment of the gas panel of this invention.

DETAILED DESCRIPTION

Introduction

The drawing shows a display 12 of the gas panel having a set 13 of row wires and a set 14 of column wires. The row and column wires form light emitting cells at crossover points, and the display is operated to produce dot matrix characters. In the drawing, groups of three column wires and three row wires illustrate a character position having a selected number of dots. The drawing shows the first two character rows, 16 and 17 and the first two character positions, 19 and 20. The drawing also shows the last column wire 23 and the last row wire 24.

The column wires are connected to be energized through individual switches 27 and the row wires are connected to be energized through individual switches 28. These switches operate to give the associated wire one of two voltage values for write and erase operations. Additionally, circuits that are not shown in the drawing produce an alternating polarity sustain waveform across each cell of the gas panel. These conventional components of the gas panel are described in more detail in application Ser. No. 365,922 of W. R. Lamoureaux, filed June 1, 1973 and assigned to the assignee of this invention.

A write operation occurs at a cell when its row wire and column wire are each given an appropriate voltage. In a character writing operation, the three drivers of the column wires of the character position are energized in succession. Each of these columns can be thought of as a slice of the character. When a column wire is energized, the three wires of the character row are selectively energized to produce the light pattern for the corresponding slice of the character. Thus, in a normal sequential write operation the column wires are energized successively from left to right while a selected group of three row wires receive a sequence of signals that represent successive slices of the characters being written in the row. When the last column wire 23 has been energized, the operation shifts to the next group of three row wires and to the first column wire.

The Selection Circuit

A column counter 30 receives Increment pulses on a line 31 and it produces a sequence of count values from 0 through the number of column wires for the display. Counter 30 also receives a Decrement signal on a line 32. A decoder 33 receives the output of counter 30 and supplies a signal to turn on an individual driver 27 according to the count value held in counter 30.

Counter 30 and decoder 33 are conventional components in many data processing devices. A counter has a flip flop in each stage and connections for coupling the output of one stage to the input of the next stage. A pulse on either line 31 or 32 triggers the first (low order) stage to switch from a 1 to a 0 or from a 0 to a 1. Line 31 controls the subsequent stages to be triggered in response to a 1 to 0 transition (a "carry") from the preceding stage. Line 32 controls the subsequent stages to be triggered in response to a 0 to 1 transition (a "borrow") from the preceding stage. The borrow from the last stage of the counter appears on a line 35 and the carry appears on a line 36. A decoder has an AND circuit for each of its outputs. Each AND circuit receives the true or complement output from each counter stage and produces a 1 logic level at its output when the counter has a particular count value.

In the control circuits for the row wires, there is a latch 39 for each driver 28. The latches are connected to be controlled in response to signals on lines 40, 41, 42 that represent a character slice and to the outputs of a decoder 45 which is connected to receive the output of a counter 46. Decoder 45 and counter 46 are similar to decoder 33 and counter 30. Counter 46 receives a signal Increment on a line 47 and a signal Decrement on a line 48 and it produces a signal Carry on a line 49.

The drawing shows a first decoder output 52 that is connected to the three latches for the first character lines 16 of the display and an output 53 for latches of the second character row 17. A last output 55 of decoder 45 controls the latches for the last row wire 24 and the two preceding row wires (not shown). Lines 40, 41, and 42 are each connected to a corresponding one of the three latches for each character row of the display. A 1 logic level signal on both inputs to a latch 39 causes a corresponding driver to produce a write signal on the corresponding row wire. Thus, the components that have been described so far operate to produce a write operation in any of the three cells at the intersection of one column wire and the three row wires of a character row.

The Character Generator

A keyboard 58 is manually operated to produce a code on a line 59 that identifies a particular character or operation that has been entered by a user of the system. The code on line 59 is used as an address for fetching a word in a read only store (ROS) 60 that operates as a character generator. A word in store 60 has a data field that supplies the bits that appear on lines 40, 41 and 42. It has a second field that supplies a next address on a line 61 so that the character generator produces a sequence of character slices on lines 40, 41 and 42. It has a third field that supplies the signals on lines 31 and 32 and supplies signals on lines 62 and 63 that will be described later. It receives signals on lines 68 and 69 that form part of the next address to provide branching. Control stores are well known and are described in detail in *Microprogramming: Principles and Practices* by Samir S. Husson, published by Prentice-Hall.

Interconnecting Logic

The modular components of the drawing and the panel 12 are interconnected by means that include gates 70, 71, and 72. These components will be described as they appear in the following examples of various operations of the display.

Suppose that the display is blank and that counters 30 and 46 are reset to select the first or upper left most character position of the display. A user might key a character from keyboard 59. In response to the character code on line 59, a corresponding storage location in character generator 60 is read and the bits of this word appear at the outputs of the character generator. Three of these bits appear on lines 40, 41 and 42 to produce write voltages in a selected pattern on the three wires of character row 16. The left most column wire for character position 19 is selected from the output of decoder 33 and a write operation takes place selectively in these three cells. The control word also supplies a signal on line 31 to advance counter 30 and a signal appears on line 61 to select the next control word from character generator 60. The cited application of Lamoureaux describes circuits for generating the timing signals that are required for an individual write operation. This operation proceeds slice by slice to the control word for the last slice, which contains an address field that terminates the operation.

This general operation proceeds across the character row until the operation reaches the last column wire 23 or until the keyboard user enters a carriage return to advance to the next row. If the operation advances to the last character position, the counter contains all 1's to begin the operation of writing the last character slice in the column of wire 23. The Increment pulse on line 31 that accompanies this operation resets the counter to all 0's and produces a Carry signal on line 36. This Carry signal is transmitted through OR gate 70 to produce the signal Increment on line 47 to advance counter 46 to the next row. Similarly, a keyboard entry to advance the row without changing the column position (an operation called "Index") produces a code on line 59 to fetch a control word that produces a 1 logic level signal on line 63 to control gate 70 to produce the signal Increment on line 47. A complement operation fetches a control word that produces a 1 on line 62 to decrement the column counter.

A carriage return signal from the keyboard produces an operation code on line 59 to fetch a control word that skips or writes blanks in the remaining character positions in the row. For this operation, store 60 fetches the same control word for each column so long as the Carry signal from line 36 is a 0 at the input 69 to the addressing components of character generator 60. At the end of the line the Carry signal produces a change in the address to character generator 60 and a word is fetched that terminates this operation.

This example illustrates a variety of conventional keyboard operations that can be implemented readily in a standardized form without regard to the size of the display panel in the system of this invention.

Preferably, the control word that advances the row counter also addresses a control word that writes blanks across the next row to erase anything that may have been previously written. At the end of this operation, the carry signal on line 69 produces a branch in the store of character generator 60 to prevent the incrementing of the row counter which follows the two end of line operations that have been described already.

When the operation has proceeded to the last character position, a Carry signal appears on line 36 as has already been described and a Carry similarly appears on output 49 from row counter 46. An AND gate 72 combines these signals to produce a signal End of Frame signal on line 68. One common operation at the end of a frame is to write a cursor in the first position of the display. A cursor is a underlining bar or other special character that identifies the position for the next write operation, and it is written in the same way that has already been described for normal characters except that it is written automatically as a new position is entered and that the column counter is returned to the appropriate position for entering a normal character.

When a backspace operation is signalled from the keyboard, a control word is fetched in character generator 60 to decrement the column counter one character position and, optionally, to write a blank in that position. When the backspace proceeds beyond the first character position of a line, a Borrow signal on line 35 is transmitted through OR gate 71 to decrement row counter 46.

Other Embodiments

The operations that have been described illustrate the use of the gates 70, 71 and 72 and the associated input and output signals and they also illustrate a variety of conventional display operations that can be advantageously implemented in the modular system of this invention. The preferred display uses a read only store for character generating and for control, but the invention can also be used with keyboards that supply character codes separately from operation codes and with displays that have sequential logic and timing circuits for handling the operation codes. The invention is also useful with displays of the type in which control words for an entire frame are loaded into a buffer and are read sequentially for a write operation on the display. Conventional features of a particular display have been shown for illustration, but the invention can be used with a variety of displays.

From this description of a preferred embodiment of the invention, those skilled in the art will recognize a variety of applications for this invention and suitable modifications within the spirit of the invention and the scope of the claims.

What is claimed is:

1. A modular display system, comprising, a display panel having a row and column array of light emitting cells, means for producing a write operation at selected row and column coordinates of the array, and a row counter and a column counter for selecting the coordinates of a next character position for the write operation, means for supplying a signal defining a graphic symbol to be written in a next character position of the display, character generator and control means responsive to said symbol signal for supplying symbol forming signals to said write means and for supplying control signals, including column increment signals, for associated operations of the display system, means connecting said character generator and control means to provide increment signals to said column counter to advance the character position as a write operation proceeds, and means connecting said row counter and said column counter to provide carry signals to said character generator and control means to initiate an operation at the end of A line and at the end of a frame.

2. The modular display of claim 1 including means connecting said column counter to provide a carry signal to increment said row counter at the end of a line.

3. The modular display of claim 2 wherein said means for supplying signals defining a graphic symbol to be written comprises a keyboard.

4. The modular display of claim 3 wherein said keyboard includes means for supplying signals defining an operation, such as carriage return, which depends on the length of a line in the display, and said character generator and control means includes means responsive to a signal defining such an operation to initiate the operation in successive character positions and responsive to said carry signal from said column counter to terminate the operation, whereby said character generator and control means is independant of the actual line length.

5. The modular display of claim 4 wherein said keyboard includes means for signalling a back space operation and said character generator and control means includes means responsive to said back space signal to provide a decrement signal to said column counter.

6. The modular display of claim 5 wherein said character generator and control means includes means providing control signals for an end of frame operation, and including, means responsive to the coincidence of said carry signal from said column counter and a carry signal from said row counter to signal said character generator and control means to initiate an end of frame operation.

* * * * *